United States Patent
Chauvin et al.

(10) Patent No.: US 7,747,380 B2
(45) Date of Patent: Jun. 29, 2010

(54) METHOD FOR REAL-TIME ESTIMATION OF ENGINE COMBUSTION PARAMETERS FROM VIBRATORY SIGNALS

(75) Inventors: Jonathan Chauvin, Neuilly-sur-Seine (FR); Yohan Bentolina, Boulogne-Billancourt (FR); Olivier Grondin, Bougival (FR)

(73) Assignee: IFP, Rueil Malmaison Cedex (FR)

( * ) Notice: Subject to any disclaimer, the term of this patent is extended or adjusted under 35 U.S.C. 154(b) by 103 days.

(21) Appl. No.: 12/281,798

(22) PCT Filed: Mar. 7, 2007

(86) PCT No.: PCT/FR2007/000410
§ 371 (c)(1), (2), (4) Date: Sep. 5, 2008

(87) PCT Pub. No.: WO2007/101946
PCT Pub. Date: Sep. 13, 2007

(65) Prior Publication Data
US 2009/0030593 A1    Jan. 29, 2009

(30) Foreign Application Priority Data
Mar. 8, 2006 (FR) .................................. 06 02111

(51) Int. Cl.
*F02P 5/00* (2006.01)
*G06F 19/00* (2006.01)
*G01L 23/22* (2006.01)

(52) U.S. Cl. .................. 701/111; 701/115; 123/406.24; 73/114.07

(58) Field of Classification Search ............ 123/406.24, 123/406.37–406.39, 494; 73/114.07; 701/111, 701/115
See application file for complete search history.

(56) References Cited

U.S. PATENT DOCUMENTS

| 3,783,681 | A | * | 1/1974 | Hirt et al. | 73/114.02 |
| 4,488,240 | A | * | 12/1984 | Kapadia et al. | 702/56 |
| 4,491,930 | A | * | 1/1985 | Hyatt | 708/3 |
| 4,976,241 | A | * | 12/1990 | Ishida et al. | 123/406.37 |
| 5,373,448 | A | * | 12/1994 | Katogi et al. | 701/111 |

(Continued)

FOREIGN PATENT DOCUMENTS

EP    0 724 159 A1    7/1996

OTHER PUBLICATIONS

Oppenheim, Alan V., et al: "Nonlinear Filtering of Multiplied and Convolved Signals", Proceedings of the IEEE, IEEE, New York, U.S. vol. 56, No. 8, Aug. 1968, pp. 1264-1291, XP000946572, ISSN: 0018-9219, p. 1267, colonne Droite, Figure 10.

*Primary Examiner*—Thomas N Moulis
(74) *Attorney, Agent, or Firm*—Antonelli, Terry, Stout & Kraus, LLP.

(57) ABSTRACT

The invention relates to a method having application to combustion control of an internal-combustion engine for real-time estimation of engine combustion parameters from vibratory signals. A vibratory signal representative of the engine vibrations is continuously acquired as a function of the crank angle, from a vibration detector. Real-time filtering of this vibratory signal and real-time estimation of the Fourier decomposition coefficients for the acquired vibratory signal is carried out by inverting the dynamics of the filter which is used. Finally, real-time estimation of combustion parameters allowing the combustion to be qualified is carried out from these coefficients.

36 Claims, 5 Drawing Sheets

U.S. PATENT DOCUMENTS

| | | | |
|---|---|---|---|
| 5,410,621 A * | 4/1995 | Hyatt ........................ 382/260 |
| 5,638,305 A * | 6/1997 | Kobayashi et al. .......... 700/280 |
| 5,687,082 A * | 11/1997 | Rizzoni ...................... 701/111 |
| 5,862,507 A * | 1/1999 | Wu et al. .................... 701/111 |
| 6,006,155 A * | 12/1999 | Wu et al. .................... 701/111 |
| 6,188,952 B1 * | 2/2001 | Serra et al. ................. 701/103 |
| 6,223,120 B1 * | 4/2001 | Williams .................... 701/111 |
| 6,614,396 B2 * | 9/2003 | Pina et al. ................... 342/401 |
| 6,990,419 B2 * | 1/2006 | Ramillon et al. .............. 702/76 |
| 7,509,945 B2 * | 3/2009 | Teets et al. .................. 123/497 |
| 7,594,423 B2 * | 9/2009 | Padhi et al. ................. 73/35.09 |
| 2002/0092499 A1 * | 7/2002 | Kargilis et al. ......... 123/406.58 |
| 2003/0163242 A1 * | 8/2003 | Miyauchi et al. ............ 701/111 |
| 2004/0236494 A1 | 11/2004 | DeBotton et al. |

* cited by examiner

METHOD FOR REAL-TIME ESTIMATION OF ENGINE COMBUSTION PARAMETERS FROM VIBRATORY SIGNALS

BACKGROUND OF THE INVENTION

1. Field of the Invention

The present invention relates to a method for real-time estimation of combustion parameters of an internal-combustion engine from the vibratory response of the engine delivered by a vibration detector (accelerometer).

2. Description of the Prior Art

Standards for emission reduction have led to a progressive adaptation of engine technologies such as the introduction of additional actuators (exhaust gas recirculation valves, direct electronic injection and variable-geometry turbines) and new combustion modes (homogeneous diesel combustion or stratified gasoline combustion). In this context, the engine has become an assembly of complex systems requiring management by means of modern automation techniques. The engine control function manages the available actuators to guarantee engine performance while meeting environmental constraints. A fundamental aspect of engine control lies in the combustion control system via precise management of the thermodynamic conditions in the cylinders (temperature, boost pressure, composition of the mixture admitted) and of the adjustment of the injection parameters.

The new combustion modes, such as homogeneous diesel combustion, are much less polluting than conventional combustions (gasoline or diesel), but they are, on the other hand, much more sensitive. They therefore involve an additional investment in terms of regulation. Loop combustion control is possible only if information is available on the combustion progress and if it can be influenced through the control of the available actuators. These parameters can be obtained from direct measurement of the pressure in the combustion chamber by means of a specific detector. This method allows direct access to physical combustion parameters but, because of the life and cost of this type of detectors, they cannot yet be standard in vehicles. To date, it is more realistic to turn towards alternative techniques such as the estimation of combustion parameters from non-intrusive measurements. A synthesis of the existing methods is presented below:

Ionization current interpretation: The principle measures the ionization current generated during combustion. During combustion, some chemical reactions cause release of ions. Their production is influenced by the temperature and pressure conditions in the cylinder. To detect them, the plug is permanently supplied with a low-amplitude voltage. The ionization current contains information on the successive combustion stages: ignition, flame front propagation and a stage associated with the pressure and temperature variations at the end of the reaction. Eriksson and Nielsen have shown in the document mentioned below, for example, that the maximum pressure during a cycle and its argument can be identified by interpreting the ionization current:

L. Eriksson, *Spark Advance Modeling and Control*, Ph.D. thesis, Linköping University, Sweden, 1999.

Analysis of the instantaneous rotating speed of the crankshaft: The speed is measured by means of an encoder mounted at one end of the crankshaft. The cylinder pressure is reconstructed by inversion of the kinematic chain of the engine, the model thereof being of course known. The following document can be referred to for example:

S. J. Citron, J. E. O'Higgins & L. Y. Chen, *Cylinder by Cylinder Engine Pressure and Pressure Torque Waveform Determination Utilizing Speed Fluctuations*, SAE Paper (1989), No. 890486.

Reconstruction from engine vibration measurements: The vibrations of an internal-combustion engine can be measured by means of a detector, referred to as accelerometer, mounted on the engine. An accelerometer is a detector that, in a given reference system, measures the acceleration of the body to which it is fastened (or one of its components) and allows the resulting impacts and vibrations to be studied. Extraction of coherent combustion parameters from an accelerometer is difficult because of the nature of the signal that is delivered. In fact, this signal does not only contain information on combustion because the vibratory response of the engine is also due to other events, such as injection nozzle chattering, piston return stroke to the top dead center, vibrations induced by the distribution system, etc.

The use of accelerometer type detectors has already been described in previous books. The following documents, wherein the cylinder pressure is to be estimated from the signal delivered by the accelerometer, are exemplary:

Y. Gao & R. B. Randall, *Reconstruction of Diesel Engine Cylinder Pressure Using a Time Domain Smoothing Technique*, Mechanical Systems and Signal Processing 13 (1999), no. 5, 709-722, H. Du, L. Zhang & X. Shi, *Reconstructing Cylinder Pressure from Vibration Signals Based on Radial Basis Function Networks*, Proceedings of the Institution of Mechanical Engineers, Part D 215 (2001), 761-767, R. Johnsson, *Cylinder Pressure Reconstruction Based on Complex Radial Basis Function from Vibration and Speed Signals*. Mechanical Systems and Signal Processing, 2006.

Du et al. address with the cylinder pressure estimation problem by means of signal processing techniques involving deconvolution or inverse filtering. They have shown the capacity of a neural network to carry out an approximation of the non-linear transfer function between the evolution of the cylinder pressure and the generated vibratory signal. Johnsson uses a similar method according to which the signal delivered by the accelerometer is combined with the engine speed signal to reconstruct the pressure signal and the combustion parameters by means of a neural network whose inputs are imaginary variables.

Other methods using accelerometric detectors for controlling the combustion of an engine are also known:

EP Patent 1,116,946 describes a method and a system for controlling the combustion from signals delivered by an accelerometer, according to which the measured signal is windowed (combustion occurrence period). This signal is then processed during each control loop and it is compared with a reference signal in order to determine the changes to be made to the combustion parameters. Processing the signal from the accelerometer comprises three main stages: rectification, filtering and integration.

U.S. Pat. No. 2,004,267,430 (WO-05,001,263) describes a method of processing accelerometric signals resulting from the vibrations of an internal-combustion engine. In particular, the signals are filtered by spectral filters and the combustion analysis curve is reconstructed by deconvolution of a transfer function identified from an experimental database. The result is an estimation of the combustion parameters allowing combustion control. For example, the parameter referred to as SoC (Start of Combustion) is estimated from a polynomial depending on the energy release, its maximum angle and the boost pressure.

German Patent 19,536,110 (French Patent 2,739,414) describes a method of processing accelerometric signals resulting from vibrations for controlling the combustion of a diesel engine. In particular, the signals are filtered in two different frequency bands. The first frequency band [10 kHz, 30 kHz] allows extraction of components associated with the injection by means of a thresholding device. The second frequency band [0.5 kHz, 4 kHz] allows extraction of the signal components generated by the combustion using an identical thresholding method.

French Patent 2,834,789 describes a knock signal processing method. The method adjusts the acquisition sampling frequency to the engine speed. The Fourier transform is calculated for the various sampling value groups for a frequency of interest. The information on the combustion results from the summation of the Fourier transform results.

The parameters from the aforementioned approaches cannot be used directly for applications linked with internal-combustion engine diagnosis and control. These methods are based on a temporal integration of a signal delivered by an accelerometer. Processing of the signal from the accelerometer is not carried out in real time. Furthermore, these methods greatly depend on the nature of the combustion and/or on the technology of the detector used. Their field of application is therefore limited.

The present invention provides a method for controlling the combustion of an internal-combustion engine, regardless of the nature of the combustion and of the technology of the vibration detector that is used, from processing of the signal delivered by an accelerometer based on a real-time estimation of the harmonic decomposition of the accelerometric signal. The method provides real-time calculation of combustion state indicators.

SUMMARY OF THE INVENTION

The invention thus relates to a method for determining combustion parameters of an internal-combustion engine comprising at least one vibration detector, comprising continuous acquisition, as a function of the crank angle, of a vibratory signal delivered by the at least one detector and representative of the vibrations of the engine, the vibratory signal comprising several harmonics, and real-time filtering of the vibratory signal with a filter. The method is characterized by the following stages:
  constructing a model of the dynamics of the filter and, from the constructed model, defining an adaptive type non-linear estimator comprising a term related to the dynamics and a correction term;
  estimating in real time the Fourier decomposition coefficients for the vibratory signal acquired by means of the estimator;
  deducing in real time combustion parameters from the coefficients; and
  determining the energy of k harmonics of the vibratory signal through a sum of k squared Fourier decomposition coefficients, and using the energy to determine combustion parameters in real time.

The vibratory signal comprises several harmonics and the Fourier decomposition coefficients can be estimated only for harmonics correlated with the combustion.

According to the invention, the harmonics correlated with the combustion can be selected by carrying out a spectral analysis, a time/frequency analysis, or by selecting the harmonics in the 300 Hz-3000 Hz frequency band. The number of harmonics selected can generally be three.

It is also possible to determine an angular range including a whole combustion-related vibratory response to limit the vibratory signal to the angular range prior to filtering. Filtering can be performed from a band-pass filter.

The estimator, it can be an adaptive type non-linear estimator, which is well suited for real-time estimation.

Finally, according to the invention, the combustion parameters can represent at least one of the following three phenomena: start of combustion (SoC), maximum of combustion (MoC), duration of combustion (DoC) and energy of combustion (EoC).

Estimation of combustion parameters according to the invention can be used within the context of combustion control of an internal-combustion engine.

The invention can be applied to engine control by modifying engine parameters according to the determination of the combustion parameters for engine combustion control.

BRIEF DESCRIPTION OF THE DRAWINGS

Other features and advantages of the method according to the invention will be clear from reading the description hereafter of embodiments given by way of non limitative example, with reference to the accompanying figures wherein.

DETAILED DESCRIPTION OF THE INVENTION

The present invention provides a method for controlling the combustion of an internal-combustion engine, from processing a signal delivered by an accelerometer and allowing real-time delivery of combustion parameters (PoC) having a physical meaning for directly qualifying the combustion. The method is independent of the nature of the combustion and of the technology of the vibration detector that is used.

The invention is described according to a particular embodiment wherein the method applied to a single cylinder is described without integrating specific characteristics associated with the engine combustion mode (diesel, diesel LTC, gasoline, gasoline in stratified mode) and with the technology of the vibration detector(s) used. The nature of the internal-combustion engine and the technology of the vibration detector used do not influence the principle of the method.

Figure 1:
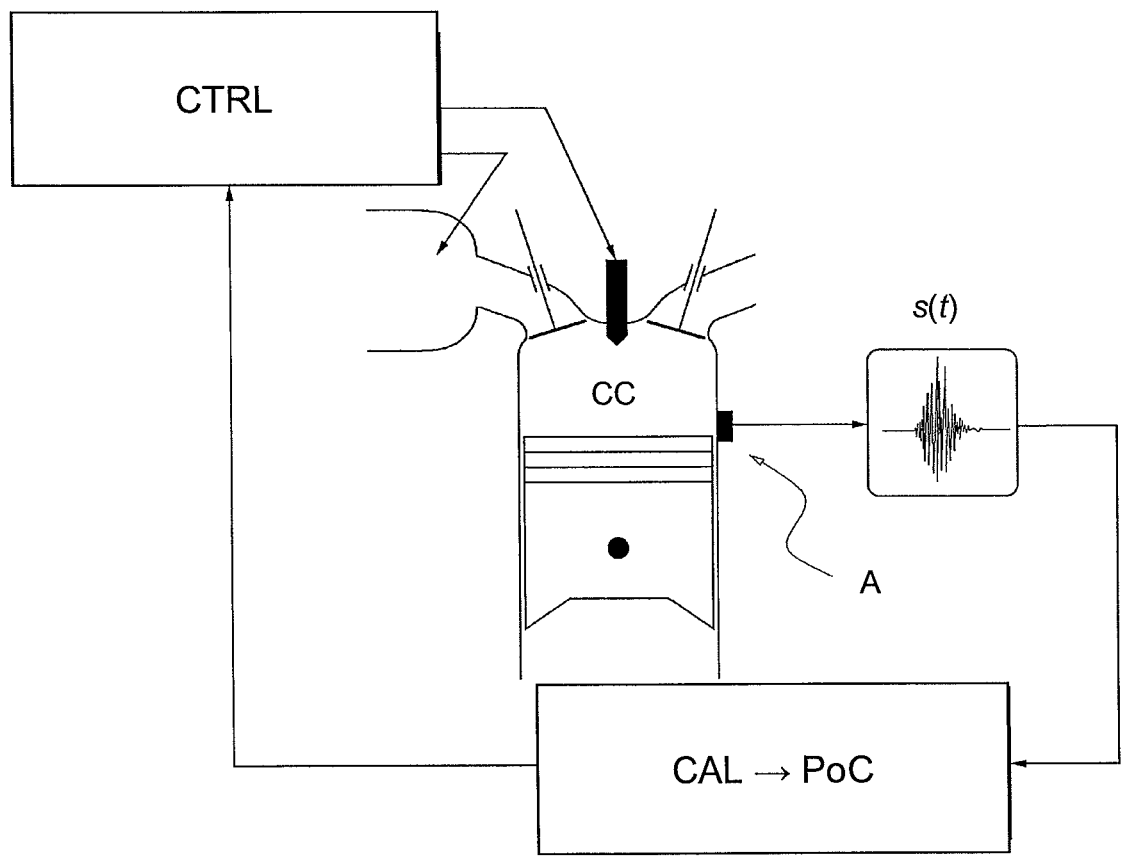
FIG. 1 shows the flowsheet of the looped combustion control according to the invention.
Figure 2:
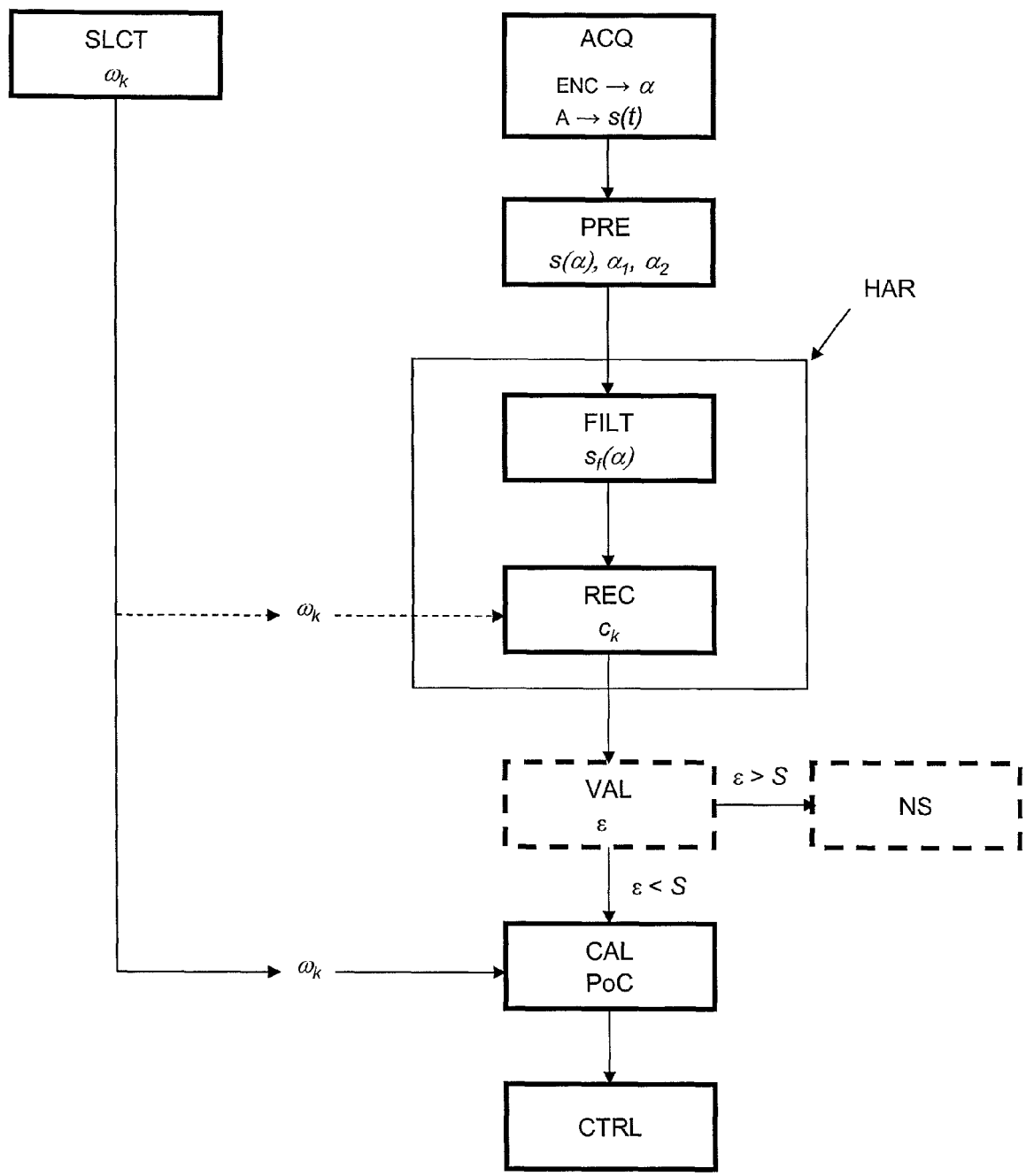
FIG. 2 shows a block diagram splitting up the calculation of parameters PoC.

FIG. 1 illustrates the general principle of the looped combustion control method according to the invention. A vibratory signal (s(t)) delivered by an accelerometer (A) is first acquired. This vibratory signal corresponds to a set of phenomena, including the combustion in combustion chamber (CC). It is well known that only some harmonics of this signal contain information qualifying the combustion. The principle is thus to calculate the various harmonics of this vibratory signal in real time, then to select those corresponding to the combustion. Finally, from these harmonics comprising information on the combustion, physical parameters (PoC) qualifying directly the combustion and allowing adjustment (CTRL) of the engine parameters to control the combustion are calculated, still in real time. As illustrated in FIG. 2, the engine combustion control method can be divided into five main stages:

Preliminary Stage:
  Stage 1—Selection of the harmonics qualifying the combustion (SLCT) Stages carried out in real time:
  Stage 2—Acquisition of a signal (ACQ) delivered by a vibration detector (A)
  Stage 3—Real-time determination of the signal harmonics (HAR)
  Stage 4—Real-time determination of parameters for direct combustion qualification (CAL)
  Stage 5—Engine control: Adjustment of the engine parameters for combustion control (CTRL).

Stage 1: Selection of the Harmonics Qualifying the Combustion

Any periodic oscillating quantity (or alternately increasing and decreasing quantity) such as the vibratory signal can be considered to be the sum of sinusoidal components whose frequencies are integral multiples of the fundamental frequency. The latter, also referred to as basic frequency, is equal to the inverse of the period of the quantity considered. Multiple frequencies are sinusoidal components whose frequency is an integral multiple of the fundamental frequency. These multiple frequencies are referred to as harmonics.

Each harmonic comprises one or more data: noise, combustion, injection nozzle chattering, piston return stroke to the top dead center, vibrations induced by the distribution system, etc.

The goal is first to select, among these components, those containing information qualifying the combustion. This operation amounts to extracting the useful part of the signal delivered by the accelerometer without being affected by parasitic phenomena.

Two methods can be considered to determine the harmonics allowing qualification of the combustion: time/frequency analysis or spectral analysis. These methods are applied to signals from accelerometers within the context of experiments carried out prior to the stages allowing real-time engine combustion control.

Time/frequency analysis of the signal can be interpreted as a sliding window wherein a fast Fourier transform (FFT), which is well known, is performed at each time interval. This form of Fourier transform is also known as short-time Fourier transform and its representation in the time/frequency plane is given by a spectrogram. A spectrogram is a diagram associating with each time t of a signal its frequency spectrum. In the commonest format thereof, the horizontal axis represents time and the vertical axis frequency. Each point within the diagram is provided with a given intensity that indicates the amplitude (often in decibels) of a particular frequency at a given time. In the sphere of car industry, it is common practice to replace the temporal axis by an angular axis corresponding to the value of the crank angle. In such a spectrogram, the combustion periodicity clearly appears on the angular axis. These events correspond to periodic phenomena which are synchronous with events that occur during an engine cycle part of which is linked with the combustion. Conventionally, within the context of analysis of vibratory signals delivered by accelerometers arranged in an internal-combustion engine, angular spread zones are clearly seen in some frequency bands between 5000 Hz and 10,000 Hz, and short event zones between 0 and 3000 Hz. The latter frequency band corresponds to events of a more impulsive nature, and therefore closer to a combustion phenomenon.

It is also possible to use a spectral analysis to refine the result. In fact, calculation of a simple FFT does not always allow performing of a fine spectral analysis of the signal. Another frequency analysis technique allows obtaining such an accuracy level. It is the spectral analysis that allows access to the Power Spectral Density (PSD) allowing precise measurement of the distribution on the frequency axis of the spectral power of a stationary signal. An example of a spectral analysis method allowing determination of the PSD is for instance the Yule-Walker modelling method described in the following document:

Friedlander, B., and B. Porat, "*The Modified Yule-Walker Method of ARMA Spectral Estimation*" IEEE Transactions on Aerospace Electronic Systems, AES-20, No. 2 (Mars 1984), pp. 158-173.

The spectral analysis thus provides a PSD curve as a function of the frequency. In this type of curve, within the context of processing signals from accelerometers, there are various frequency phenomena having peaks which represent one or more events. As a result of an analyses based on engine control experience, three types of phenomena have been isolated: combustion, injection and various noises. Conventionally, within the context of the analysis of vibratory signals from accelerometers arranged in an internal-combustion engine, the only frequency band whose harmonic component appears to result only from the vibrations due to combustion corresponds to the lower band between 300 Hz and 3000 Hz. This refines the band determined by a time/frequency analysis.

Thus, according to the method, it is possible to either fix the frequency band of interest for qualifying the combustion between 300 Hz and 3000 Hz, or to determine, as a function of the engine type for example, the suitable frequency band by means of a spectral analysis.

In the description below, the 300 Hz-3000 Hz frequency band is used to estimate combustion parameters (PoC).

The signal harmonics (frequency components) selected are denoted by: $\omega_k$ with $k \in [1,p]$. The integer p is selected in such a way that these p harmonics belong to the 300 Hz-3000 Hz frequency band.

Stages 2 to 5 are carried out in real time.

Stage 2: Acquisition of a Signal Delivered by a Vibration Detector

The combustion control method is based on processing a signal continuously delivered by an accelerometer. This acquisition type is well known. However, according to the signal processing method provided by the method of the invention, the vibratory detector (accelerometer) can be mounted either on the cylinder head or on the engine block. The technology of the vibration detector that is used also does not influence the principle of the method. The vibratory signal acquired by the accelerometer is denoted by s(t). Variable t represents time.

As illustrated in FIG. 2, the signal delivered by the accelerometer, s(t), is one of the two inputs of the processing chain. The second signal, $\alpha(t)$, is a signal giving the value of the crank angle as a function of time. The crank angle is denoted by $\alpha$. This signal is delivered by an angular encoder (ENC).

The invention is not influenced by the position of the vibration detector, by its technology or by the engine combustion mode and some adjustment parameters can be modified in order to optimize the quality of estimation of the combustion parameters. For example, signal s(t) can be upscaled according to the acquisition device and to the detector type that is used.

Stage 3: Real-Time Determination of the Signal Harmonics

The goal is first real-time estimation of all the harmonic components of the vibratory signal from the accelerometer, or at least of the useful harmonic components selected in stage 1. Real-time reconstruction of these components means that a signal is not recorded continuously in order to be processed later, for example, to obtain the harmonic components, by means of a Fourier decomposition. Instead, these components are estimated as the signal is being measured. A Fourier observer is therefore used. The method can comprise the following stages:

extraction of the useful part of the signal: vibratory signal preprocessing (PRE) and estimation of the harmonics by a Fourier observer (HAR).

Extraction of the Useful Part of the Signal: Vibratory Signal Preprocessing (PRE)

Processing the signal delivered by the accelerometer is an essential element in the engine control chain since it provides variables that can be used for looped combustion control, as illustrated by FIG. 2. The first stage processes the vibratory signal to extract a maximum amount of useful information therefrom. This preprocessing (prior to reconstruction of the harmonics and of the combustion parameters) intended to extract the useful part of the vibratory signal can comprise the following stages: sampling of s(t) in the angular domain, determination of an angular window including the combustion.

Sampling s(t) in the Angular Domain

Signal s(t) is sampled in the angular domain. This signal is then denoted by $s(\alpha)$. The angular domain is, in contrast with the temporal domain, the domain wherein all the data are expressed as a function of the crank angle. This stage allows working in an invariant frame field for all rotating machines. The second advantage of working in the angular domain is that injection is controlled angularly, in relation to the top dead center (TDC), which facilitates injection control for the combustion. However, angular encoder (ENC) that defines the origin of the frame field in the angular domain as the top dead center must of course be properly calibrated.

Determination of an Angular Window $[\alpha_1; \alpha_2]$ Including the Combustion Signal s(t) is continuously measured by an acquisition circuit card and then converted to the angular domain ($s(\alpha)$). However, the rest of the processing is carried out only within an angular range limited by angles $\alpha_1$ and $\alpha_2$. These two parameters belong to the calibration elements of the combustion observer (Fourier observer according to the invention). Limits $\alpha_1$ and $\alpha_2$ depend on the angular combustion occurrence range, which can be early (several degrees before TDC) or on the contrary very late (20 degrees after TDC), depending on the combustion mode. For a given engine, limits $\alpha_1$ and $\alpha_2$ must be selected to include the whole of the combustion vibratory response, over the entire engine operating range. These angles are defined in relation to the top dead center representing the origin of the frame. Angle $\alpha_1$ thus is negative and angle $\alpha_2$ positive.

In fact, the method's goal is to process the vibratory signal in a predetermined time window of the signal from the detector, whose position corresponds to a predetermined angular position of the engine crankshaft. The signal from the detector contains, within this time window or the corresponding angular window $[\alpha_1; \alpha_2]$, information on the vibratory behaviour of the engine, allowing determination of combustion parameters in order to estimate the combustion quality.

Estimation of the Harmonics by Means of a Fourier Observer (HAR)

The principle filters the signal from the accelerometer $s(\alpha)$ and then inverts the filter dynamics by real-time reconstruction of the useful harmonic components, using a Fourier observer. It is possible to reconstruct the components of a single or of a combination of several accelerometric signals coming from one or more vibration detectors mounted on an internal-combustion engine (engine block and/or cylinder head).

Band-Pass Filtering of Signal $s(\alpha)$ in Angular Window $[\alpha_1; \alpha_2]$ (FILT)

After windowing, signal $s(\alpha)$ is filtered by means of a band-pass filter allowing removal of useless spectral components determined by spectral analysis. This signal filtered in window $[\alpha_1; \alpha_2]$ is denoted by $s_f(\alpha)$. The cut-off frequencies ($F_1$ and $F_2$) of the filter also are adjustment parameters for the combustion observer. They are notably linked with the structure of the engine that conditions the frequency content of the vibratory response, and with the detector that is characterized by a band-pass depending on the technology thereof. A spectral analysis of signal $s(\alpha)$ as described in stage 2 allows selection of the useful frequency band (qualifying the combustion) and adjusting the cut-off frequencies ($F_1$ and $F_2$) of the band-pass filter.

Reconstruction of the Useful Harmonics by Inversion of the Band-Pass Filter (REC)

Reconstruction (estimate) is desired, from measurement $s_f(\alpha)$ of the filtered signal from the accelerometer, of the frequency components (harmonics) of this signal. The method mainly comprises three stages: defining a model of the vibration detector dynamics, characterizing the vibratory signal by parameters that are quasi-invariant over time and coupling with an adaptive type non-linear estimator and, possibly, checking the estimation quality.

Band-Pass Filter Dynamics Model

The vibrations generated by the engine make up an excitation, denoted by $\omega$, recorded by a vibration detector in form of a signal, denoted by $s(\alpha)$. This measurement is then filtered $s_f(\alpha)$ by means of a band-pass filter. This filter can be given the form, in the angular domain, of the following state system:

$$\begin{cases} \dfrac{dx}{d\alpha} = A \cdot x + A_0 \cdot \omega \\ y = C \cdot x \end{cases} \quad (1)$$

with:

$$x = \left[ s_f(\alpha) \; \dfrac{ds_f(\alpha)}{d\alpha} \; \ldots \; \dfrac{d^n s_f(\alpha)}{d\alpha^n} \right],$$

referred to as state vector $\alpha$: the crank angle $\omega$: the engine excitation y: the model output, equal to C.x, that is measured signal $s_f(\alpha)$ (A, $A_0$, C): the parameters defining the band-pass filter used, with:

$$A = \begin{bmatrix} -a_1 & 1 & 0 & \ldots & \ldots & 0 \\ -a_2 & 0 & 1. & \ldots & \ldots & \ldots \\ \ldots & \ldots & \ldots & \ldots & \ldots & \ldots \\ \ldots & \ldots & \ldots & \ldots & \ldots & 0 \\ -a_{n-1} & 0 & \ldots & \ldots & 0 & 1 \\ -a_n & \ldots & \ldots & \ldots & 0 & 0 \end{bmatrix},$$

$$A_0 = \begin{bmatrix} b_1 \\ \vdots \\ b_{n-1} \\ b_n \end{bmatrix},$$

$C = [1 \quad 0 \quad \ldots \quad 0]$ of dimension $1 \times n$

Coefficients $a_0 \ldots a_n$ and $b_0 \ldots b_n$ are defined as a function of frequencies $F_1$ and $F_2$. They correspond to the numerical coefficients of the band-pass filter used.

This equation (1) is the model representing in real time the band-pass filter dynamics.

Characterization of Signal ω by Parameters Quasi-Invariant Over Time

It is desired to estimate, from this model of the filter dynamics and of measurement y (equal to $s_f(\alpha)$), signal ω, that is the reconstruction of the vibratory signal generated by the engine $s(\alpha)$ with the useful frequencies (containing information relative to combustion). In the method according to the invention, signal ω is characterized by parameters quasi-invariant over time, which allows the estimation to be carried out in real time. In other words, signal ω is defined by means of parameters that are constants at a given time. The fact that signal ω is mechanically periodic is therefore exploited. Thus, instead of carrying out an estimation of highly variable signal ω, the coefficients of the Fourier decomposition of this signal can be estimated. It is also possible to use any parameter allowing description of signal ω in relation with its periodic character.

The decomposition into Fourier coefficients of signal ω, developed into complex for clarity reasons, is written as follows:

$$\omega(\alpha) = \sum_{k=1}^{p} c_k e^{(i\omega_k \alpha)} \quad (2)$$

The quantity $c_k$ represents the p Fourier coefficients of the decomposition of signal ω. A signal expressing the vibratory signal, as a function of parameters $c_k$ invariant over time, is thus defined. Using only a finite number of harmonics, the model representing in real time the dynamics of the vibration detector is then written as follows:

$$\begin{cases} \dfrac{dx}{d\alpha} = A \cdot x + A_0 \cdot \left( \sum_{k=1}^{p} c_k e^{(i\omega_k \alpha)} \right) \\ \dfrac{dc_k}{d\alpha} = 0, \quad \forall k \in [1, p] \\ y = C \cdot x \end{cases} \quad (3)$$

According to the invention, the goal is to estimate the Fourier coefficients ($c_k$) of the decomposition of signal ω.

Coupling with an Adaptive Type Non-Linear Estimator

It is desired to define an estimator, referred to as "Fourier observer", to reconstruct the periodic excitation of the accelerometric signal from its filtered measurement $s_f(\alpha)$. The filter dynamics are therefore inverted and the frequency components of the accelerometric signal are reconstructed.

From the model described by system (3), we define an adaptive type non-linear estimator is defined comprising, on the one hand, a term linked with the dynamics and, on the other hand, a correction term:

$$\begin{cases} \dfrac{d\hat{x}}{d\alpha} = A\hat{x} + A_0 \sum_{k=1}^{p} \hat{c}_k e^{(i w_k \alpha)} - L(C\hat{x} - s_f(\alpha)) \\ \dfrac{d\hat{c}_k}{d\alpha} = -e^{(-i w_k \alpha)} L_k (C\hat{x} - s_f(\alpha)), \quad \forall k \in [1, p] \\ \hat{y} = C\hat{x} \end{cases} \quad (4)$$

with:
$\hat{x}$: estimated value of x
$\hat{c}_k$ estimated value of $c_k$
L: a matrix to be calibrated
$L_k$: matrices to be calibrated to ensure convergence.

A selection of matrices L and $L_k$ ensuring convergence of the estimator (observer) is as follows:

$$L = \begin{bmatrix} 1 \\ \vdots \\ 1 \end{bmatrix}$$

$$L_k = \frac{1}{k^2 + 1} \quad \forall k \in [1, p]$$

The system of equations (4) represents an adaptive type non-linear estimator allowing to estimation of coefficients $c_k$ of the decomposition into Fourier coefficients of signal ω.

This method provides reconstruction of excitation ω through coefficients $c_k$. The reconstructed accelerometric signal $\hat{\omega}$ is given by the following relation:

$$\hat{\omega}(\alpha) = \Sigma \hat{c}_k(\alpha) e^{i w_k \alpha}$$

and we have: $\hat{y} = C\hat{x} = \hat{s}_f(\alpha)$.

Harmonics Selection

The case has been considered where the harmonics selected in stage 1 ($\omega_k$) are used to reconstruct the signal: k ranges between 1 and p, p harmonics are therefore used, and these harmonics contain information qualifying the combustion.

However, estimation $\hat{\omega}(\alpha)$ of the excitation can be carried out from a larger number of harmonics. In fact, the more Fourier coefficients that are used, the more accurate the reconstruction is of excitation ω. A number of harmonics (p), different from the number of harmonics selected in stage 1, can also be chosen without departing from the scope of the invention. On the other hand, it is clear that the larger the number of harmonics which are selected to reconstruct excitation ω, the longer the calculating time. A compromise therefore has to be found between the calculating speed and accuracy.

The goal thus is to determine both the pertinent $\omega_k$ and the suitable parameter p, that is the selection of the number of harmonics required for reconstruction of the signal. This selection depends on the respective energies of the various harmonics. In general, the first three harmonics are the most significant for qualifying the combustion and they are sufficient for excitation reconstruction. In most cases, selection is p=3. The signal thus reconstructed is denoted by $\hat{s}(\alpha)$.

Checking the Estimation Quality (VAL)

In order to prevent erroneous parameters from being sent to the engine control, an optional stage shown in dotted line in FIG. 2 allows the pertinence of the reconstruction of the accelerometric signal to be validated. A threshold on the square of the error signal (difference between the measurement and the estimation) provides this function.

$$\epsilon = (y - \hat{y})^2$$

If this threshold ☐ is too great, above a fixed threshold S, the parameters are not sent to the engine control (NS). In the opposite case, stage 4 (CAL) is carried out.

Stage 4: Determination of Parameters for Direct Combustion Qualification (CAL)

As soon as the estimation of the frequency components of the vibratory signal is validated, the engine control operation can be performed. Looped control under transient conditions of the combustion requires real-time estimation (CAL) of combustion parameters so as to reach a cycle-to-cycle control. The principle of the method is based on the real-time estimation of four parameters, referred to as PoC. They allow characterizing the combustion in the cylinder of an engine.

Calculation of the combustion parameters is based on the analysis of the energy contained in the harmonics (spectral components) which are selected. Energy E is given by the sum of the first k Fourier decomposition coefficients delivered by the periodic observer and squared:

$$E(\alpha) = \sum [c_k(\alpha)]^2$$

This parameter has a physical meaning since energy $E(\alpha)$ increases with the energy released during the combustion.

Four indicators (PoC) relating the combustion record are defined as follows:

SoC (Start of Combustion) is the start of the reaction in the cylinder;

MoC (Maximum of Combustion) is linked with the maximum energy release;

DoC (Duration of Combustion) is an indicator of the reaction duration; and

EoC (Energy of Combustion) gives a noise level generated by the combustion.

The calculation, from the vibratory signal, of these four combustion parameters (PoC) is described hereafter.

SoC (Start of Combustion) corresponds to the angle (in degrees) for which the normalized integral of energy E, denoted by I, is equal to 10% of its final value.

$$I(\alpha) = \frac{\int_{\alpha_1}^{\alpha_2} E(\alpha) d\alpha}{\max\left(\int_{\alpha_1}^{\alpha_2} E(\alpha) d\alpha\right)}$$

$$I(SoC) = 0.1$$

MoC (Maximum of Combustion) is defined as the angle (in degrees) of occurrence of the maximum of function E.

$$E(MoC) = \max(E(\alpha))$$

DoC (Duration of Combustion) is defined by the angular interval (in degrees) between the SoC and angle $\alpha_{90}$ for which function I reaches 90% of its final value.

$$DoC = \alpha_{90} - SoC$$

$$I(\alpha_{90}) = 0.9$$

EoC (Energy of Combustion) is given by integration of signal E.

$$EoC = \int_{T1}^{T2} E(\alpha) d\alpha$$

According to another embodiment, it is also possible to use a smoothing function F for smoothing the energy of the signal: $E'(\alpha) = F(E(\alpha))$.

This smoothing of the energy, denoted by $E'(\alpha)$, can then be used instead of $E(\alpha)$ to calculate combustion parameters (PoC).

Stage 5: Engine Control of Combustion (CTRL)

It is on the basis of the combination of the four combustion parameters PoC that the implementation of closed-loop control strategies is possible. The problem with multi-cylinder engine control is often linked with cylinder-to-cylinder unbalances that controllers based on mappings cannot solve. In fact, a base mapping is applied for each cylinder without taking account of possible variations. Closed-loop control provides an additional corrective term suited for the combustion in each cylinder. Cylinder-to-cylinder drifts can have several origins:

bad distribution of the mass fraction burned,
variation of the cylinder-to-cylinder thermics, and
pilot injection defect due to an actuator drift.

The aforementioned phenomena make up vectors altering both the combustion efficiency and the comfort in terms of noise and vibrations. It can be noted that the variation of the combustion property can also modify the combustion profile, and that the control values contained in the injection mappings lapse. Parameters PoC are used to compensate for fuel characteristic variations or cylinder-to-cylinder unbalances. Two control strategies from parameters PoC are given hereafter by way of example.

Combustion timing adjustment: Combustion timing is an essential component because it is taken into account for combustion efficiency and emission optimization. In this precise case, the SoC and the MoC are ideal candidates for considering looping of the injection advance since they are representative of the combustion timing.

Noise control system: The noise generated by the combustion can, if it exceeds certain limit values, affect the vehicle driving comfort. Control of the mass introduced during the pilot injection provides noise reduction. It is also possible to control the start of combustion by modifying the gas mass fraction burned which is reintroduced into the cylinder. In this case, it is parameter EoC that informs of the noise level of each cylinder, which is therefore the ideal parameter for considering feedback control.

APPLICATION EXAMPLE

The performances of the invention are illustrated through an application to a diesel engine operating in HCCI mode. For didactic reasons, the example focuses on a single cylinder, but the method can be readily generalized to multicylinder engines. The goal of this example is to show the pertinence of parameters PoC from the Fourier observer by comparing them with parameters obtained from the analysis of the cylinder pressure signal. The control of the mass injected during the pilot injection is also presented and the goal of this strategy is to reduce the noise level of the engine.

Observer Calibration

Table 1, where $N_{cyl}$ represents the number of cylinders of the engine, shows the values of the parameters required for calibration of the Fourier observer.

TABLE 1

Summary of the adjustment parameters suited to the test engine

| Parameter | Unit | Description | Value |
|---|---|---|---|
| $\theta_1$ | degree | lower boundary of the angular window | −20 |
| $\theta_2$ | degree | upper boundary of the angular window | 50 |
| $F_1$ | Hertz | lower cut-off frequency of the band-pass filter | 300 |
| $F_2$ | Hertz | upper cut-off frequency of the band-pass filter | 3000 |
| p | — | number of Fourier coefficients required for signal reconstruction | 3 |
| $L_1$ | — | periodic observer matrix | ½ |
| $L_2$ | — | periodic observer matrix | ⅕ |
| $L_3$ | — | periodic observer matrix | 1/10 |
| $w_1$ | rad/s | first harmonic pulsation | $10\frac{\pi}{360}Ncyl$ |
| $w_2$ | rad/s | second harmonic pulsation | $20\frac{\pi}{360}Ncyl$ |
| $w_3$ | rad/s | third harmonic pulsation | $30\frac{\pi}{360}Ncyl$ |

Results of the Periodic Observer

Figure 3A:
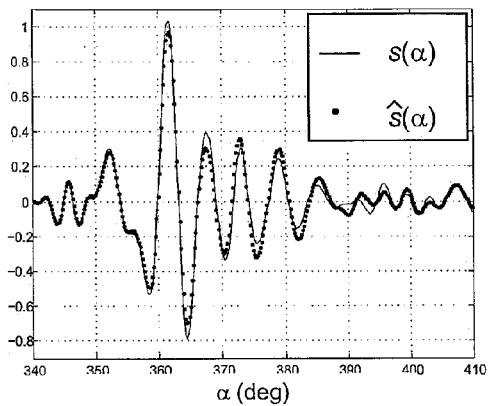
FIG. 3A shows the measured accelerometric signal $s(\alpha)$ and the reconstructed accelerometric signal $\hat{s}(\alpha)$.

FIGS. 3A to 3F illustrate the results obtained by studying the vibratory response resulting from the excitation for a given engine working point:

The measured accelerometric signal $s(\alpha)$ and the reconstructed accelerometric signal $\hat{s}(\alpha)$ are shown in FIG. 3A.

Figure 3D:
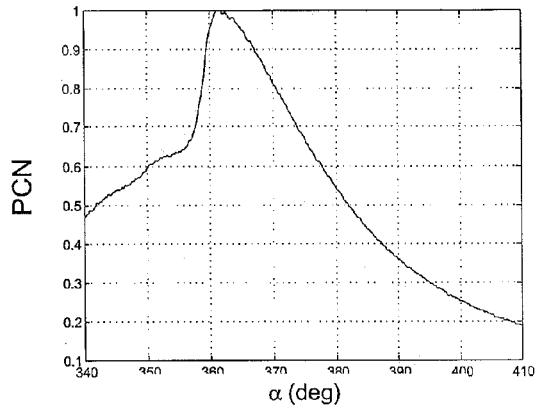
FIG. 3D illustrates the cylinder pressure (PCN)
Figure 3B:
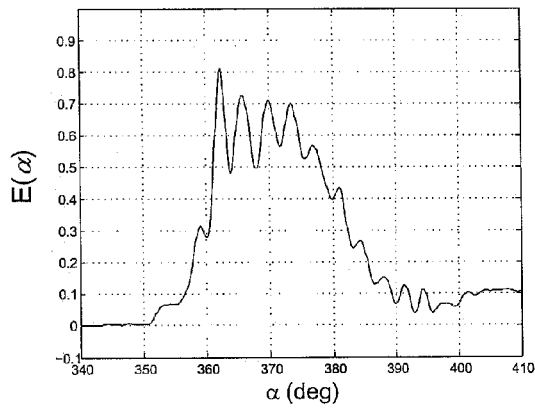
FIG. 3B illustrates the energy $E(\alpha)$ of the first three Fourier coefficients.
Figure 3E:
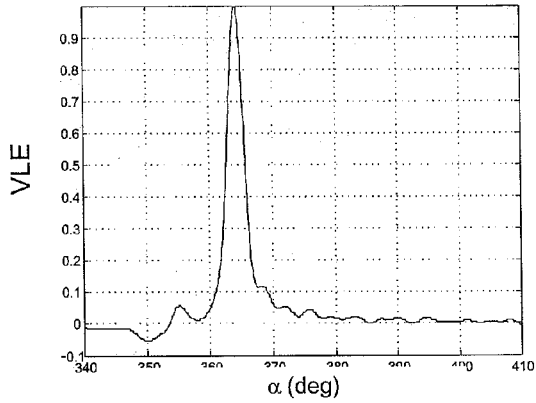
FIG. 3E illustrates the energy release rate (VLE)
Figure 3C:
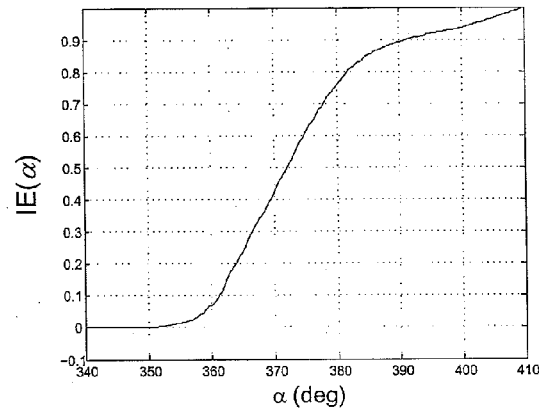
FIG. 3C illustrates the energy integral $IE(\alpha)$.

FIG. 3B illustrates the energy $E(\alpha)$ of the first three Fourier coefficients and FIG. 3C the energy integral $IE(\alpha)$.

Figure 3F:
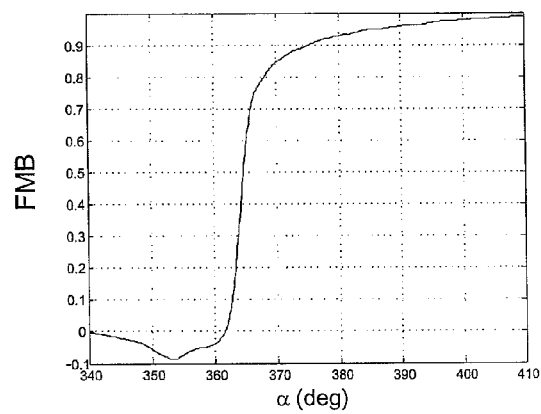
FIG. 3F illustrates the mass fraction burned (FMB)

These results are compared with a study of the pressure signal in the combustion chamber for the same engine working point. FIG. 3D represents the cylinder pressure (PCN), FIG. 3E illustrates the rate of energy release (VLE) and FIG. 3F shows the mass fraction burned (FMB).

FIGS. 3A to 3F show the analogy between the results obtained by the method according to the invention and those obtained by studying the pressure signal.

Correlations of Parameters PoC with Those Obtained from the Cylinder Pressure Analysis The method of calculating parameters PoC was tested on a database of accelerometric signals resulting from experimental surveys carried out on a test bench. The database comprises parametric variations of the following quantities:

engine speed
mean indicated pressure (MIP)
injection advance (AVI)
burned gas fraction at intake (BGR).

Figure 4:
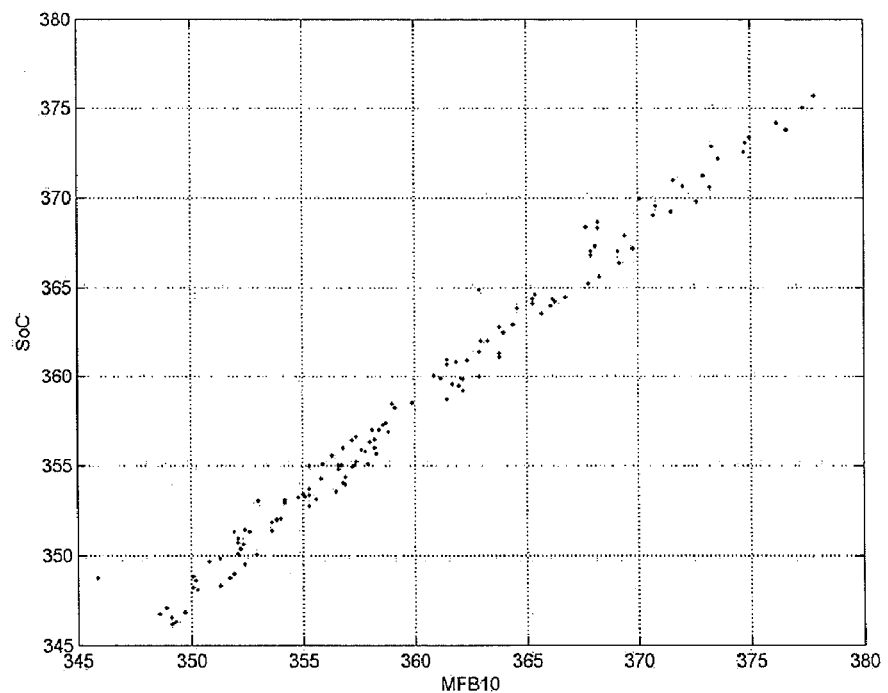
FIG. 4 shows the correlation between SoC and MFB10.
Figure 5:
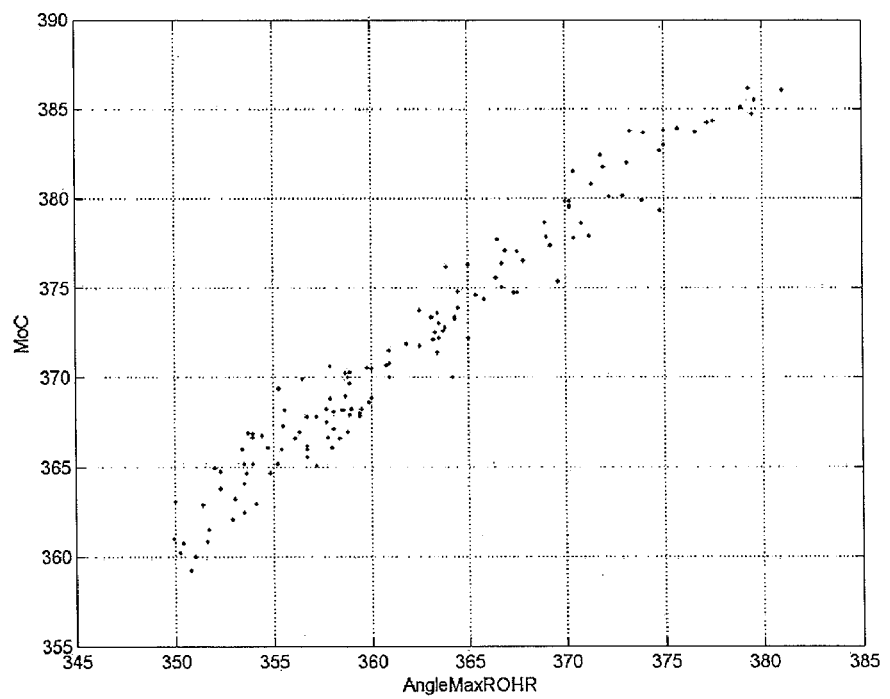
FIG. 5 shows the correlation between MoC and the occurrence angle of the maximum on the energy release rate curve (AngleMaxROHR)
Figure 6:
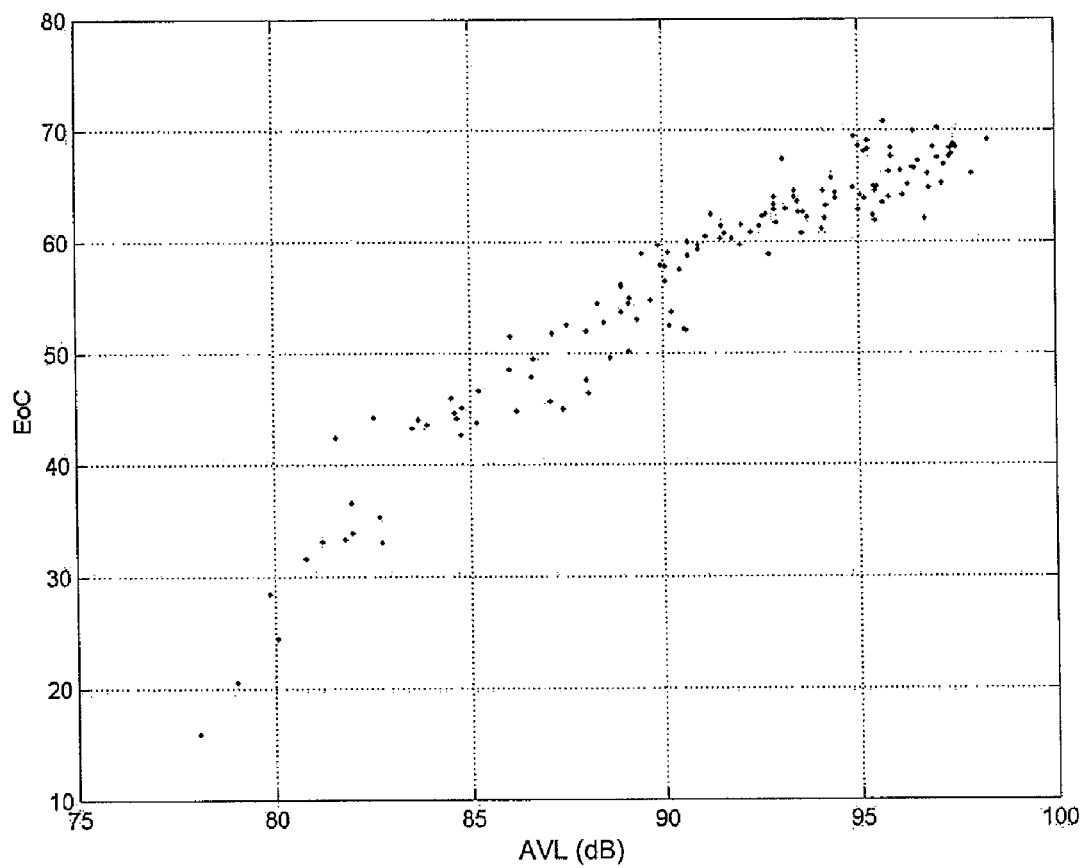
FIG. 6 shows the correlation between EoC and noise AVL in dB.

The parameters resulting from the combustion analysis are considered as reference values by experts. Thus, SoC is compared with the MFB10 representing 10% of the curve of the mass of fuel burned MFB, MoC with the crank angle corresponding to the maximum of the heat release curve ROHR (Rate of Heat Release), and EoC with the noise calculated by the noise calculation device AVL. By way of illustration of this method, results for correlations of SoC, MoC and EoC are shown in FIGS. 4, 5 and 6: FIG. 4 shows the correlation between SoC and MFB10, FIG. 5 shows the correlation between MoC and the angle of occurrence of the maximum on the energy release rate curve (AngleMaxROHR), and finally FIG. 6 shows the correlation between EoC and the noise AVL in dB.

These correlations are linear in the case of SoC and of MoC, and monotone quadratic in the case of EoC. Parameters PoC therefore make up pertinent variables for combustion control.

ADVANTAGE OF THE INVENTION

The method has the advantage, unlike prior methods, of allowing real-time access to a set of combustion parameters without direct measurement of the cylinder pressure. Thus, at the end of an engine cycle, the combustion parameters are available and can be exploited for a diagnosis of the past cycle, then for modifying (if necessary) the injection parameters in order to guarantee stability for the next combustion and its agreement in relation to the reference point (reaction initiation, combustion duration and noise for example). It can be noted that the frequency analysis of a signal can be costly in calculating time and inadequate for real-time processing. The method provided here is both accurate and fast.

Furthermore, the method according to the invention does not depend on the nature of the combustion or on the technology of the detector used. The adjustment parameters provide good adaptability of the method to various engine/detector configurations.

The invention claimed is:

1. A method of determining combustion parameters of an internal-combustion engine including at least one vibration detector providing continuous acquisition as a function of the crank angle of a vibratory signal delivered by the detector and representative of vibrations of the engine, the vibratory signal including harmonics, and real-time filtering of the vibratory signal with a filter, the method comprising:
    constructing a model of the dynamics of the filter and from the constructed model defining an adaptive non-linear estimator comprising a term related to the dynamics and a correction term;
    estimating, in real time, Fourier decomposition coefficients for the vibratory signal acquired by the estimator;
    determining, in real time, combustion parameters from the coefficients; and
    determining energy of k harmonics of the vibratory signal using a sum of k squared Fourier decomposition coefficients; and
    using the energy of the k harmonics to determine combustion parameters in real time.

2. A method as claimed in claim 1, wherein the Fourier decomposition coefficients are estimated for only harmonics correlated with the combustion.

3. A method as claimed in claim 2, wherein the harmonics correlated with the combustion are selected using spectral analysis.

4. A method as claimed in claim 2, wherein the harmonics correlated with the combustion are selected by using a time/frequency analysis.

5. A method as claimed in claim 2, wherein the harmonics correlated with the combustion are selected in the 300 Hz-3000 Hz frequency band.

6. A method as claimed in claim 1, wherein three harmonics are selected.

7. A method as claimed in claim 1, wherein an angular range including all of a combustion-related vibratory response is determined and the vibratory signal is limited to the angular range prior to carrying out the filtering.

8. A method as claimed in claim 1, wherein the filter is a band-pass filter.

9. A method as claimed in claim 1, wherein the combustion parameters represent at least one of starting of combustion, maximizing of combustion, a duration of combustion and energy of combustion.

10. A method as claimed in claim 1, wherein engine parameters are modified as a function of determination of combustion parameters for controlling combustion of the engine.

11. A method as claimed in claim 2, wherein three harmonics are selected.

12. A method as claimed in claim 3, wherein three harmonics are selected.

13. A method as claimed in claim 4, wherein three harmonics are selected.

14. A method as claimed in claim 5, wherein three harmonics are selected.

15. A method as claimed in claim 2, wherein an angular range including all of a combustion-related vibratory response is determined and the vibratory signal is limited to the angular range prior to carrying out the filtering.

16. A method as claimed in claim 3, wherein an angular range including all of a combustion-related vibratory response is determined and the vibratory signal is limited to the angular range prior to carrying out the filtering.

17. A method as claimed in claim 4, wherein an angular range including all of a combustion-related vibratory response is determined and the vibratory signal is limited to the angular range prior to carrying out the filtering.

18. A method as claimed in claim 5, wherein an angular range including all of a combustion-related vibratory response is determined and the vibratory signal is limited to the angular range prior to carrying out the filtering.

19. A method as claimed in claim 2, wherein the filter is a band-pass filter.

20. A method as claimed in claim 3, wherein the filter is a band-pass filter.

21. A method as claimed in claim 4, wherein the filter is a band-pass filter.

22. A method as claimed in claim 5, wherein the filter is a band-pass filter.

23. A method as claimed in claim 2, wherein the combustion parameters represent at least one of starting of combustion, maximizing of combustion, a duration of combustion and energy of combustion.

24. A method as claimed in claim 3, wherein the combustion parameters represent at least one of starting of combustion, maximizing of combustion, a duration of combustion and energy of combustion.

25. A method as claimed in claim 4, wherein the combustion parameters represent at least one of starting of combustion, maximizing of combustion, a duration of combustion and energy of combustion.

26. A method as claimed in claim 5, wherein the combustion parameters represent at least one of starting of combustion, maximizing of combustion, a duration of combustion and energy of combustion.

27. A method as claimed in claim 2, wherein engine parameters are modified as a function of determination of combustion parameters for controlling combustion of the engine.

28. A method as claimed in claim 3, wherein engine parameters are modified as a function of determination of combustion parameters for controlling combustion of the engine.

29. A method as claimed in claim 4, wherein engine parameters are modified as a function of determination of combustion parameters for controlling combustion of the engine.

30. A method as claimed in claim 5, wherein engine parameters are modified as a function of determination of combustion parameters for controlling combustion of the engine.

31. A method as claimed in claim 11, wherein an angular range including all of a combustion-related vibratory response is determined and the vibratory signal is limited to the angular range prior to carrying out the filtering.

32. A method as claimed in claim 11, wherein the filter is a band-pass filter.

33. A method as claimed in claim 15, wherein the filter is a band-pass filter.

34. A method as claimed in claim 11, wherein the combustion parameters represent at least one of starting of combustion, maximizing of combustion, a duration of combustion and energy of combustion.

35. A method as claimed in claim 15, wherein the combustion parameters represent at least one of starting of combustion, maximizing of combustion, a duration of combustion and energy of combustion.

36. A method as claimed in claim 19, wherein the combustion parameters represent at least one of starting of combustion, maximizing of combustion, a duration of combustion and energy of combustion.

\* \* \* \* \*